United States Patent
Huang

(10) Patent No.: US 8,276,791 B2
(45) Date of Patent: Oct. 2, 2012

(54) FEED HOPPER HAVING ROTATABLE SLEEVE

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 458 days.

(21) Appl. No.: 12/612,031

(22) Filed: Nov. 4, 2009

(65) Prior Publication Data

US 2010/0151075 A1    Jun. 17, 2010

(30) Foreign Application Priority Data

Dec. 12, 2008  (CN) .......................... 2008 1 0306205

(51) Int. Cl.
*B29C 45/18* (2006.01)
(52) U.S. Cl. .................. 222/425; 222/185.1; 222/386; 425/580
(58) Field of Classification Search ............... 222/425, 222/185.1, 519, 105, 481, 288, 254, 255, 222/553, 386; 425/580; 215/313
See application file for complete search history.

(56) References Cited

U.S. PATENT DOCUMENTS

| | | | | | |
|---|---|---|---|---|---|
| 1,693,261 | A | * | 11/1928 | Sweetland | 141/258 |
| 2,061,462 | A | * | 11/1936 | Groman | 222/542 |
| 2,550,303 | A | * | 4/1951 | Simpson | 222/618 |
| 2,762,536 | A | * | 9/1956 | Eriksen | 222/519 |
| 2,922,551 | A | * | 1/1960 | Rikijiro | 222/142.4 |
| 2,944,708 | A | * | 7/1960 | Smeaton | 222/553 |
| 2,966,286 | A | * | 12/1960 | Moran | 222/553 |
| 3,020,592 | A | * | 2/1962 | Maccaferri | 138/41 |
| 6,059,147 | A | * | 5/2000 | Yuen et al. | 222/181.3 |
| 6,848,602 | B2 | * | 2/2005 | deCler et al. | 222/153.07 |
| 7,731,063 | B2 | * | 6/2010 | Rusch | 222/306 |

FOREIGN PATENT DOCUMENTS

CN       2435220 Y    6/2001

* cited by examiner

*Primary Examiner* — Kevin P Shaver
*Assistant Examiner* — Donnell Long
(74) *Attorney, Agent, or Firm* — Altis Law Group, Inc.

(57) ABSTRACT

An exemplary feed copper, configured for introducing plastic granules into a heating cylinder of an injection molding machine, includes a feed duct, a guiding duct communicated with the feed duct, and a sleeve. The sleeve movably wraps around the guiding duct, and have a lateral through hole for conforming with the lateral opening, such that the plastic granules can be accessible via the guiding duct when the lateral through hole is aligned with the lateral opening.

12 Claims, 6 Drawing Sheets

FEED HOPPER HAVING ROTATABLE SLEEVE

BACKGROUND

1. Technical Field

The present disclosure relates to a feed hopper, and more particularly, a feed hopper including a rotatable sleeve.

2. Description of Related Art

With the development of optical technology, plastic lenses are typically manufactured by injection molding machine. The injection molding machine generally includes a feed hopper for feeding plastic granules, a heating cylinder for melting the plastic granules transported from the feed hopper, a reciprocating screw accommodated in the heating cylinder for transporting the melted plastic, an injecting member, and a plurality of molds having a cavity for accommodating the melted plastic. In an injection process of manufacturing plastic lenses, pluralities of plastic granules are firstly fed into the heating cylinder through the feed hopper, the plastic granules are consequently melted and transported by the screw rotating, and then, melted plastic is injected into the cavity of the molds using the injecting member and cooled in the cavity. Finally, the molds are separated from each other, thereby obtaining at least one plastic lens.

In actual operation, plastic granules fed into the heating cylinder may be more than the required amount. Resultantly, after finishing manufacturing predetermined amount of lenses, a plurality of plastic granules may be retained in the feed hopper. As being exposed to external environment, the moisture in the atmosphere changes the physical properties of the retained plastic granules, and makes it no longer suitable for making lenses. Generally, for purpose of removing the retained plastic granules, the retained plastic granules are melted in the heating cylinder and then spouted out of the injection mold machine with the injecting member. However, this costs much more time and waste materials.

Therefore, what is needed is feed hopper to overcome the problems described mentioned.

BRIEF DESCRIPTION OF THE DRAWINGS

Many aspects of the present feed hopper can be better understood with reference to the following drawings. The components in the drawings are not necessarily drawn to scale, the emphasis instead being placed upon clearly illustrating the principles of embodiments of the feed hopper. Moreover, in the drawings, all the views are schematic, and like reference numerals designate corresponding parts throughout the different views.

DETAILED DESCRIPTION

Figure 1:
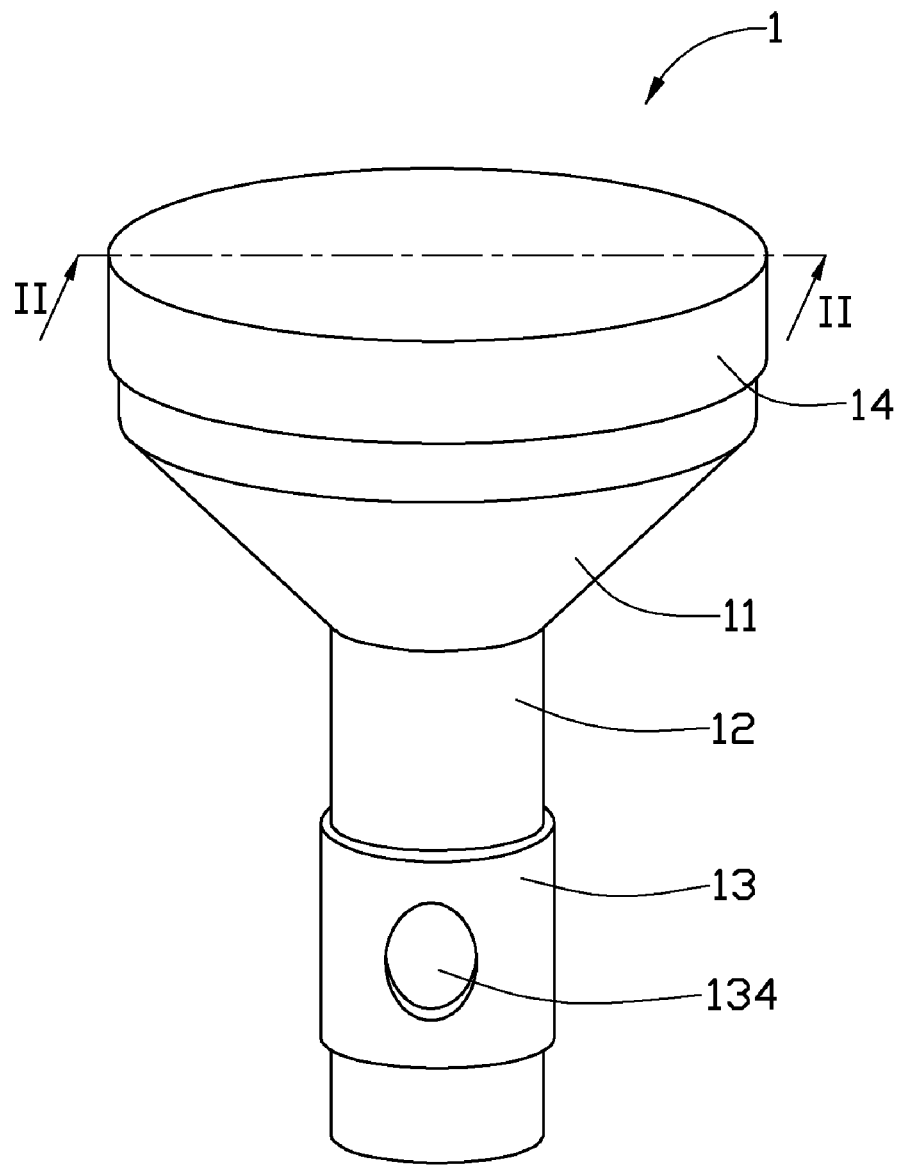
FIG. 1 is an isometric view of a feed hopper in accordance with a first embodiment, the feed hopper includes a guiding duct, and a movable sleeve wrapping around the guiding duct, the guiding duct has a lateral opening, and the sleeve has a lateral through hole.

Referring to FIG. 1, a feed hopper 1 provided in a first embodiment includes a feeding duct 11, a guiding duct 12, a sleeve 13, and a covering member 14. The feed hopper 1 can be detachably mounted to a heating cylinder of an injection molding machine (not shown), for introducing plastic granules into the heating cylinder.

Figure 2:
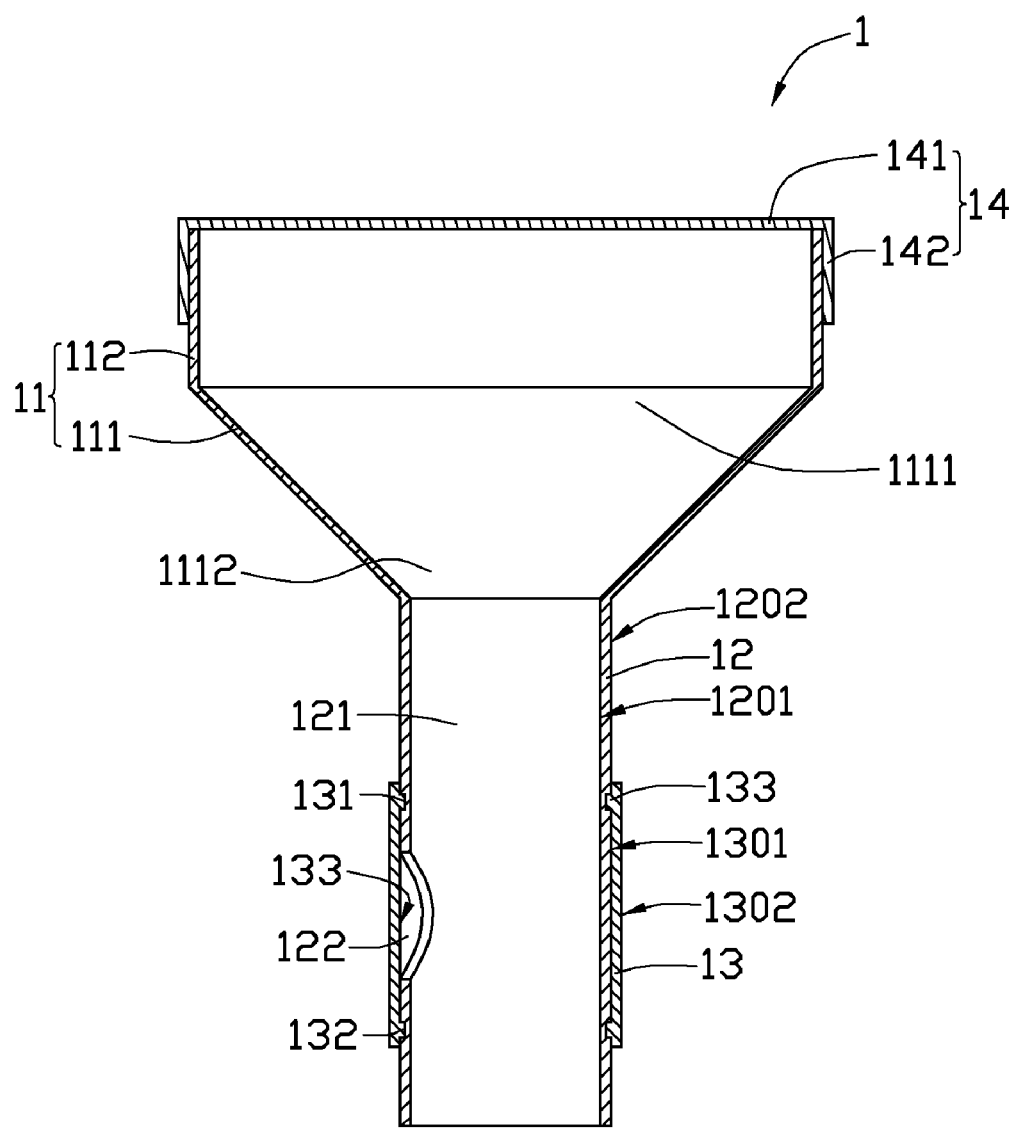
FIG. 2 is a sectional view taken along line II-II of FIG. 1.

Referring to FIG. 2, the feeding duct 11 is configured for introducing plastic granules into the guiding duct 12, and includes a first portion 111 and a second portion 112. The first portion 111 interconnects the second portion 112 and the guiding duct 12. The first portion 111 is funnel shaped and has a top inlet 111 connected with the second portion 112 and a bottom outlet 1112 connected with the guiding duct 12. A diameter of the first portion 111 gradually decreases from the top inlet 111 towards the bottom outlet 1112. The second portion 112 extends upwardly from top inlet 1111 of the first portion 111, and is coaxially communicated with the first portion 111. In other embodiments, the second portion 112 can be omitted.

The covering member 14 removably covers the second portion 112 of the feeding duct 11, configured for preventing dust and contaminations entering into the feed duct 11. The covering member 14 has a main panel 141 and a side panel 142 extending downwardly from the periphery of the main panel 141. The main panel 141 is circular shaped, and a diameter of the main panel 141 is approximately equal to that of the top inlet 1111 of the first portion 111. In other embodiments that the second portion 112 could be omitted, the covering member 14 detachably covers the top inlet 1111 of the first portion 111.

Figure 3:
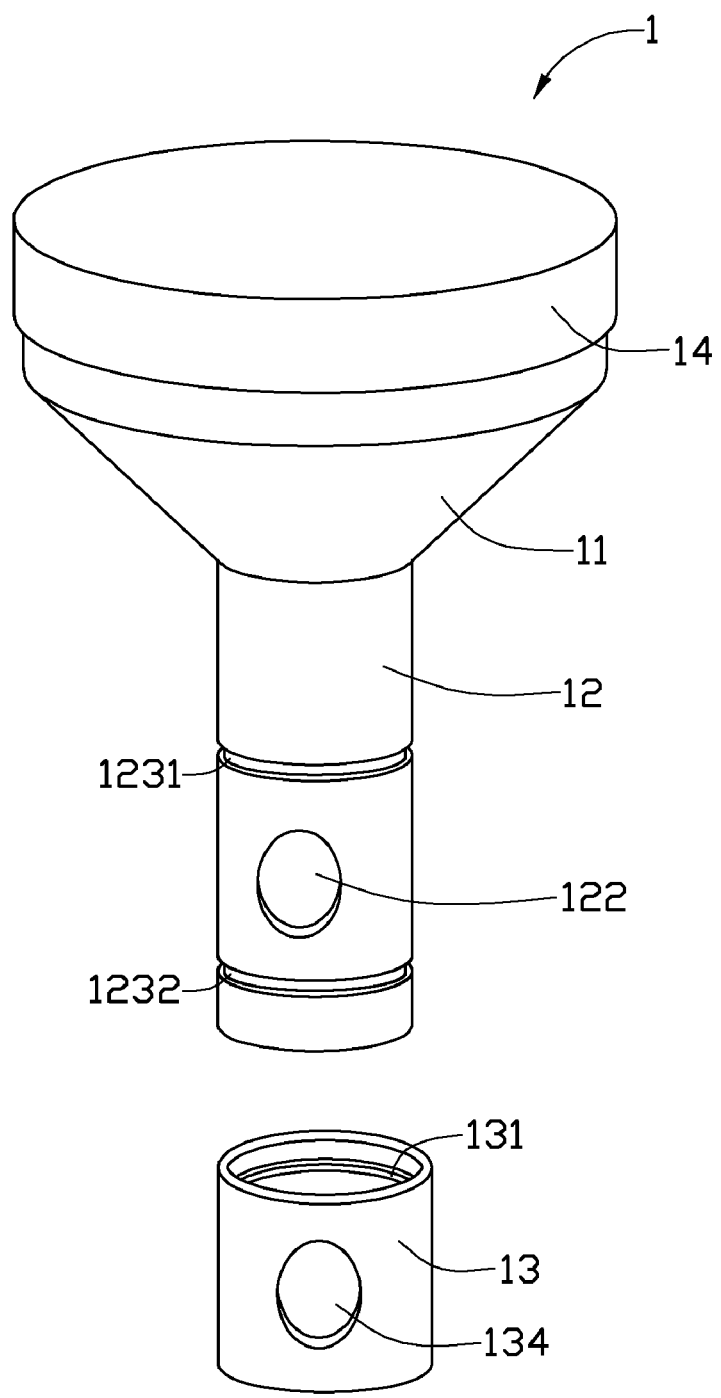
FIG. 3 is an isometric, exploded view of FIG. 1.

The guiding duct 12 is a hollow cylinder and is coaxially connected with the first portion 111 of the feeding duct 11. Referring to FIGS. 2 and 3, the guiding duct 12 has a cylindrical outer surface 1202, a cylindrical inner surface 1201 defining a guiding passageway 121 therein. The cylindrical outer surface 1202 defines a first annular groove 1231 and a second annular groove 1232. The guiding duct 12 also has a lateral opening 122 communicated with the guiding passageway 121. The lateral opening 122 is located between the first and second grooves 1231, 1232. A center axis of the lateral opening 122 is perpendicular to that of the guiding duct 12.

Referring to FIG. 2, the sleeve 13 wraps around the guiding duct 12, having a first protrusion 131 and a second protrusion 132. Both the first and second protrusions 131, 132 are circular and perpendicularly extend from an inner surface 133 of the sleeve 13. A distance between the first and second protrusions 131, 132 is approximately equal to that between the first and second grooves 1231, 1232. The first and second protrusions 131, 132 are movably engaged in the first and second grooves 1231, 1232, respectively. As such, the sleeve 13 is capable of rotating around the guiding duct 12. Referring to FIGS. 1 and 3, additionally, the sleeve 13 has a lateral through hole 134 located between the first and second protrusions 131, 132. The through hole 134 corresponds to the lateral opening 122, and a diameter of the through hole 134 is approximately equal to that of the lateral opening 122. In other embodiments, the first and second grooves 1231, 1232, and the first and second protrusions 131, 132 could be omitted. The sleeve 13 is capable of rotating around and/or sliding along the guiding duct 12.

Figure 4:
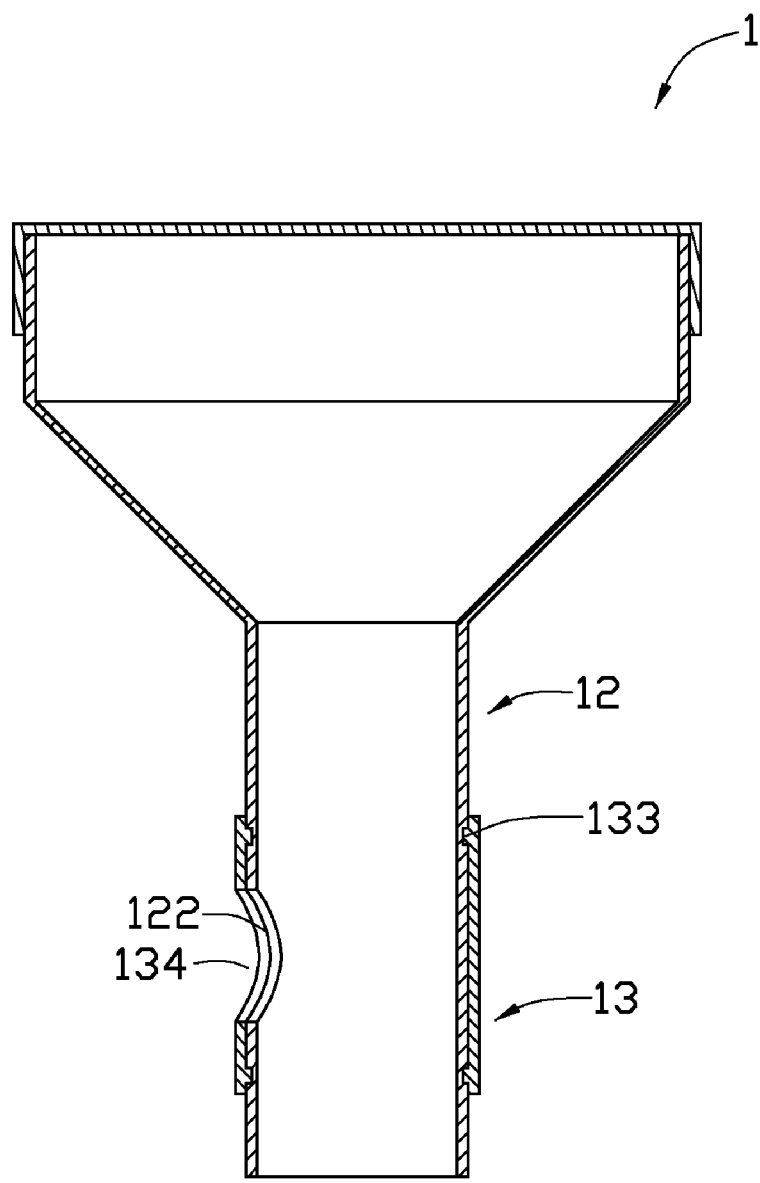
FIG. 4 is a sectional view of FIG. 1, showing the lateral opening is communicated with the lateral through hole.

Referring to FIGS. 1 and 4, in use, after consuming an amount of plastic lenses, the sleeve 13 is rotated around a center axis of the guiding duct 12 until the through hole 134 is aligned with the lateral opening 122 of the guiding duct 12. The remaining plastic granules flow out of the guiding duct 12 via the lateral opening 122 and though hole 134, and then fall into a collector (not shown).

Figure 5:
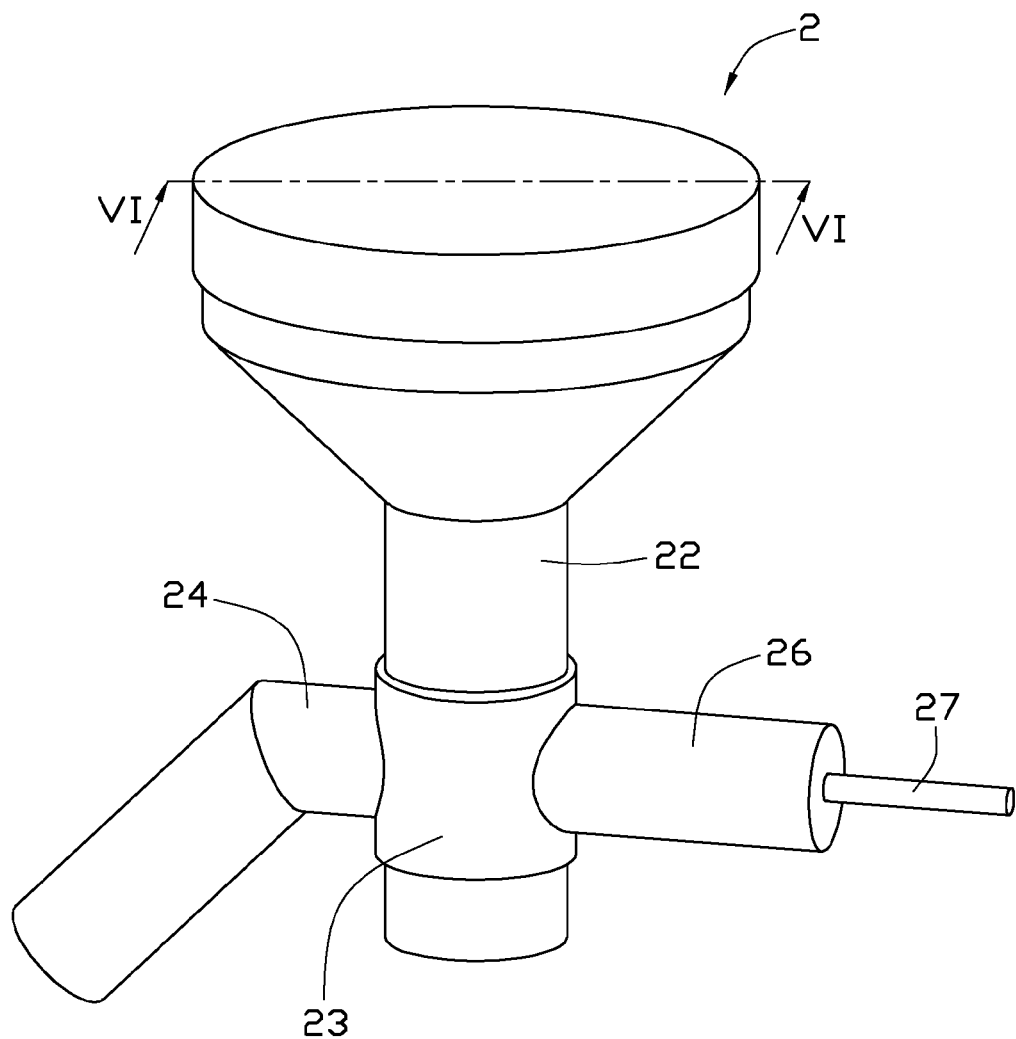
FIG. 5 is an isometric view of a feed hopper in accordance with a second embodiment.
Figure 6:
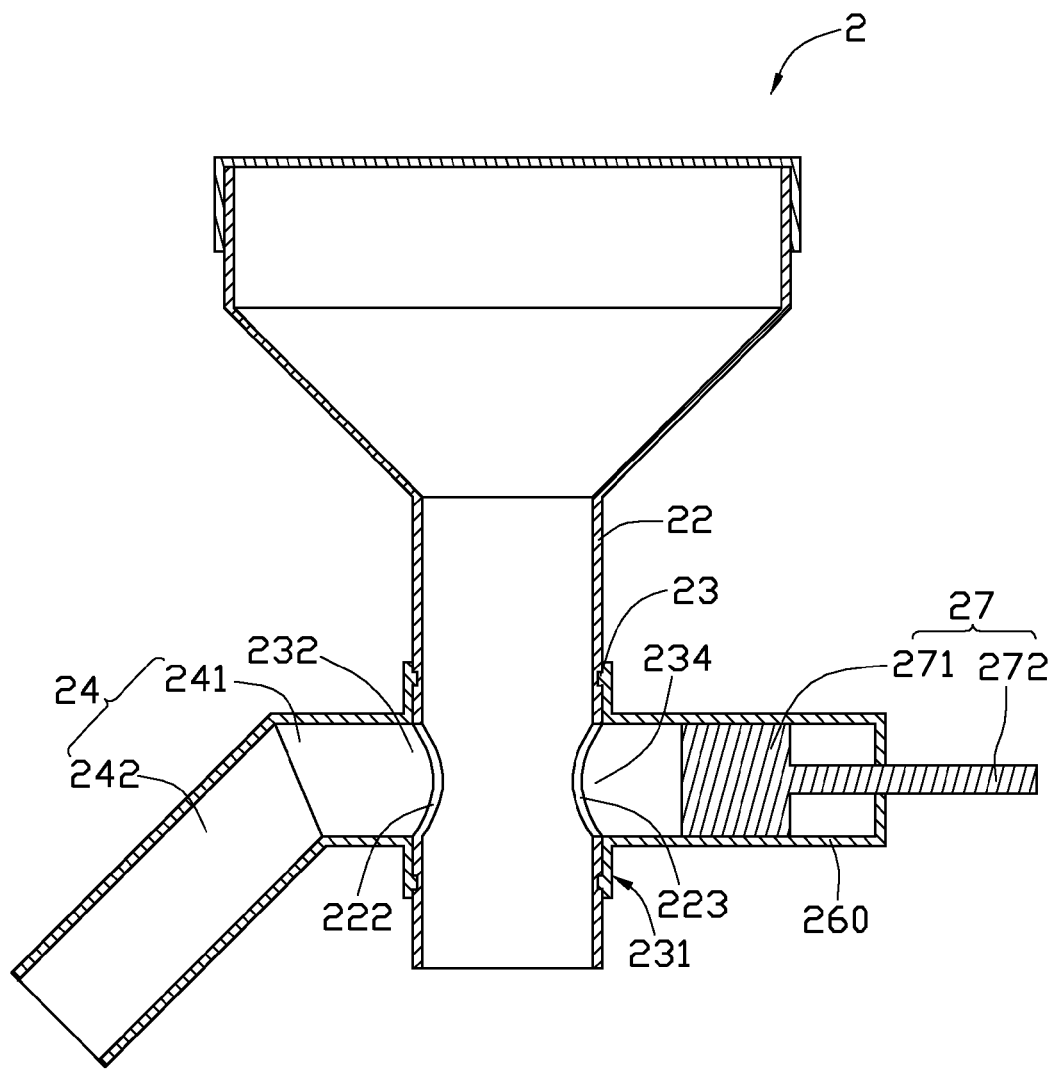
FIG. 6 is a sectional view taken along line VI-VI of FIG. 5.

Referring to FIGS. 5 and 6, a feed hopper 2 provided in a second embodiment includes a guiding duct 22 and a sleeve 23. Comparing with the feed hopper 1, the feed hopper 2 further includes an output duct 24, an introducing duct 26 and a pushing member 27.

In detail, referring to FIG. 6, the guiding duct 22 defines a first lateral opening 222 and a second lateral opening 223. The first lateral opening 222 is opposite to the second lateral opening 223. Accordingly, the sleeve 23 defines a first lateral through hole 232 for conforming with the first lateral opening 222 and a second lateral through hole 234 for conforming with the second lateral opening 223. The introducing duct 26 perpendicularly extends from the side surface 231 of the sleeve 23 with a center axis of the introducing duct 26 vertical to that of the guiding duct 22. The introducing duct 26 is communicated with the second lateral through hole 234. The pushing member 27 includes a piston 271 movable in the introducing duct 26, and a pushing shaft 272 connected with the piston 271. The output duct 24 includes a first output portion 241 and a second output portion 242. The first output portion 241 perpendicularly extends from the side surface 231 of the sleeve 23, and is communicated with the first lateral through hole 232. One end of the second output portion 242 is connected to the first output portion 241 in a manner that a center axis of the second output portion 242 is intersected with a center axis of the first output portion 241 at an acute angle. Additionally, the other end of the second output portion 242 extends downwardly and is located in a lower position.

In actual operation, prior to manufacturing plastic lenses, the sleeve 23 is rotated about the guiding duct 22 to a position where the first and second lateral openings 222, 223 are covered with the sleeve 23. It is understood that the introducing duct 26, the pushing member 27 and the output duct 24 simultaneously rotate around the center axis of the guiding duct 22. After consuming an amount of plastic lenses, the sleeve 23 is rotated around the guiding duct 22 until the first and second lateral openings 223, 224 are, respectively, aligned with the first and second lateral through holes 232, 234. As such, the introducing duct 26 and the output duct 24 are communicated with each other. And then, an external force is applied onto the pushing shaft 272 to push the piston 271 to slide in the introducing duct 26. Therefore, remaining plastic granules in the guiding duct 22 are pushed into the first output portion 241 of the output duct 24, and then fall into a collector (not shown) along the second portion 242 of the output duct 24.

While certain embodiments have been described and exemplified above, various other embodiments will be apparent from the foregoing disclosure to those skilled in the art. The present invention is not limited to the particular embodiments described and exemplified but is memberable of considerable variation and modification without departure from the scope and spirit of the appended claims.

What is claimed is:

1. A feed hopper, comprising:
   a feeding duct;
   a guiding duct having a first lateral opening, the guiding duct communicating with the feed duct, the guiding duct further having a second lateral opening opposite to the first lateral opening;
   a sleeve movably wrapping around the guiding duct, the sleeve having a first lateral through hole for conforming with the first lateral opening, such that the plastic granules can be accessible via the guiding duct when the first lateral through hole is aligned with the first lateral opening, the sleeve further having a second lateral through hole conforming with the second lateral opening;
   an output duct extending from an outer surface of the sleeve in communication with the first lateral through hole;
   an introducing duct extending from the outer surface of the sleeve in communication with the second lateral through hole; and
   a pushing member comprising a piston movable in the introducing duct and a pushing shaft connected with the piston.

2. The feed hopper of claim 1, wherein the guiding duct is coaxial with the feeding duct.

3. The feed hopper of claim 1, wherein the feeding duct includes a first funnel-shaped portion.

4. The feed hopper of claim 3, wherein the feeding duct further includes a second portion communicating with the first funnel portion, the second portion extends from an opposite end of the first funnel portion to the guiding duct.

5. The feed hopper of claim 4, wherein the second portion is cylinder shaped.

6. The feed hopper of claim 3, wherein the second portion is coaxially with the first portion.

7. The feed hopper of claim 1, wherein the sleeve has a protrusion perpendicularly extending from an inner surface thereof.

8. The feed hopper of claim 7, wherein the guiding duct has a circular groove in an outer surface, the protrusion of the sleeve is slidably engaged in the groove.

9. The feed hopper of claim 1, wherein the sleeve is rotatable relative to the guiding duct.

10. The feed hopper of claim 1, further comprising a covering member, the covering member removably covers the feeding duct.

11. The feed hopper of claim 1, wherein an inner diameter of the output duct is equal to that of the first lateral through hole.

12. The feed hopper of claim 1, wherein the output duct includes a first output portion and a second output portion, the first output portion extends from the outer surface of the sleeve in communication with the first lateral through hole, the second output portion connected with the first output portion and extending downwardly from the first output portion.

* * * * *